(12) United States Patent
Graham et al.

(10) Patent No.: US 10,082,137 B2
(45) Date of Patent: Sep. 25, 2018

(54) OVER PRESSURE RELIEF SYSTEM FOR FLUID ENDS

(71) Applicant: Caterpillar, Inc., Peoria, IL (US)

(72) Inventors: Curtis John Graham, Peoria, IL (US); Samuel Jaroslav Stafl, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 387 days.

(21) Appl. No.: 14/995,477

(22) Filed: Jan. 14, 2016

(65) Prior Publication Data

US 2017/0204850 A1 Jul. 20, 2017

(51) Int. Cl.
*F04B 49/24* (2006.01)
*F16L 17/06* (2006.01)
*F04B 53/10* (2006.01)
*F16K 17/04* (2006.01)
*F16K 27/00* (2006.01)
*F04B 19/22* (2006.01)
*F04B 53/14* (2006.01)
*F16K 17/06* (2006.01)
*E21B 43/26* (2006.01)

(52) U.S. Cl.
CPC .............. *F04B 49/24* (2013.01); *F04B 19/22* (2013.01); *F04B 53/10* (2013.01); *F04B 53/143* (2013.01); *F16K 17/04* (2013.01); *F16K 17/065* (2013.01); *F16K 27/003* (2013.01); *E21B 43/26* (2013.01); *Y10T 137/7762* (2015.04); *Y10T 137/7925* (2015.04)

(58) Field of Classification Search
CPC .................. F04B 49/24; F04B 2205/03; Y10T 137/7762; Y10T 137/7925
See application file for complete search history.

(56) References Cited

U.S. PATENT DOCUMENTS

| 2,960,936 | A | * | 11/1960 | Dean | F02M 59/00 417/307 |
|---|---|---|---|---|---|
| 4,850,392 | A | | 7/1989 | Crump et al. | |
| 5,362,215 | A | | 11/1994 | King | |
| 6,796,321 | B2 | * | 9/2004 | Vicars | F16K 17/02 137/467 |
| 7,335,002 | B2 | | 2/2008 | Vicars | |
| 8,132,558 | B2 | | 3/2012 | Lucas et al. | |
| 8,444,398 | B2 | | 5/2013 | Brunet et al. | |
| 8,784,081 | B1 | | 7/2014 | Blume | |
| 2014/0193230 | A1 | * | 7/2014 | McWethy | E02F 9/226 414/680 |
| 2014/0305410 | A1 | | 10/2014 | Lucas | |

FOREIGN PATENT DOCUMENTS

| JP | 08128405 A | * | 5/1996 |
| JP | H08128405 | | 5/1996 |
| JP | 3534854 | | 6/2004 |

* cited by examiner

*Primary Examiner* — Atif Chaudry
(74) *Attorney, Agent, or Firm* — Procopio, Cory, Hargreaves & Savitch LLP

(57) ABSTRACT

A relief valve assembly includes a housing assembly defining a chamber therein. The relief valve assembly includes a piston. The piston may be at least partially disposed within the chamber. The relief valve assembly includes a pilot inlet. The pilot inlet may be configured to provide a pilot pressure proximate a second end of the chamber. The relief valve assembly includes an overpressure inlet sealed from a first end of the chamber by the piston. The overpressure inlet may be configured to provide an inlet pressure which may actuate the piston when the inlet pressure exceeds the pilot pressure.

14 Claims, 3 Drawing Sheets

OVER PRESSURE RELIEF SYSTEM FOR FLUID ENDS

TECHNICAL FIELD

This disclosure relates to hydraulic fracturing in general and, more specifically, to a fluid end having a relief valve assembly.

BACKGROUND

Subterranean hydraulic fracturing is conducted to increase or stimulate production from a hydrocarbon well. To conduct a fracturing process, high pressures are used to pump special fracturing fluids, including some that contain "proppants", down the well-bore and into a hydrocarbon formation to split or "fracture" the rock formation along veins or planes extending from the well-bore. Plunger pumps are commonly used in the oil and gas industry for hydraulic fracturing purposes. Plunger pumps have a fluid end and a power end that drives the fluid end. Proppants may get stuck in portions of the fluid end which may cause extreme pressure build up.

U.S. Pat. No. 7,335,002 to Vicars is directed to a fluid end for a high-pressure pump including a unitary body with a plurality of horizontal passages each for receiving a reciprocating plunger at one of its ends and a pressure relief valve at the other of its ends. The body is provided with a corresponding number of vertical passages each of which intersect one of the horizontal passages and contains a suction valve at its bottom and a discharge valve at its top. A suction manifold is hingedly attached to the bottom of the body to provide a flow of fluid into the body via the suction valves. A discharge passage intersects the vertical passages and receives fluid pressurized by the plungers via discharge valves and ports such from the fluid end.

The present disclosure is directed toward overcoming one or more of the problems discovered by the inventors or that is known in the art.

SUMMARY OF THE DISCLOSURE

In one embodiment, a relief valve assembly for a fluid end of a well stimulation pump is provided. The relief valve assembly includes a housing assembly defining a chamber therein. The chamber may have a first end and a second end. The relief valve assembly includes a pilot inlet in fluid communication with the second end of the chamber. The pilot inlet may be configured to provide a pilot pressure proximate the second end of the chamber. The relief valve assembly includes an overpressure inlet adjacent the first end of the chamber. The overpressure outlet may extend from the chamber and adjacent to the first end of the chamber. The relief valve assembly includes a piston at least partially disposed within the chamber. The piston may be sealably engaged to the chamber. The piston may fluidly separate the first end from the second end. The piston may be actuatable between a first position, the piston preventing fluid communication between the overpressure inlet and the overpressure out, and a second position, the piston allowing fluid communication between the overpressure inlet and the overpressure outlet.

In another embodiment, a fluid end for a well stimulation pump is provided. The fluid end includes a fluid end housing including a compression area. The fluid end includes a discharge conduit in valved communication with the compression area. The fluid end includes a suction cavity in valved communication with the compression area. The fluid end includes an access port in valved communication with the compression area. The fluid end includes a relief valve assembly located in the access port. The relief valve assembly includes a housing assembly defining a chamber therein. The chamber may have a first end and a second end. The relief valve assembly includes a pilot inlet in fluid communication with the discharge conduit and the second end of the chamber. The pilot inlet may be configured to provide a pilot pressure proximate the second end of the chamber. The relief valve assembly includes an overpressure inlet adjacent the first end of the chamber. The overpressure outlet may extend from the chamber and adjacent to the first end of the chamber. The relief valve assembly includes a piston at least partially disposed within the chamber. The piston may be sealably engaged to the chamber. The piston may fluidly separate the first end from the second end. The piston may be actuatable between a first position, the piston preventing fluid communication between the overpressure inlet and the overpressure out, and a second position, the piston allowing fluid communication between the overpressure inlet, the overpressure outlet, and the suction cavity.

In yet another embodiment, a method for managing pressure of a fluid mixture in a compression area of a fluid end for a well stimulation pump. The fluid mixture may be in fluid communication with a relief valve assembly having a chamber therein. The chamber may have a first end, a second end, and an actuatable piston therein. The piston may have a first end and a second end. The first end of the chamber may be sealed by the first end of the piston. The first end of the piston in fluid communication with the compression area. The method includes suctioning the fluid mixture from a suction cavity into the compression area. The method includes pumping the fluid mixture out of the compression area into a discharge cavity and expelling the fluid mixture through a discharge conduit. The method includes generating a pilot pressure against the back end of the piston by the discharge conduit in fluid communication with the second end of the chamber. The method includes when the pressure of the compression area exceeds the pilot pressure, actuating the piston to unseal the first end of the chamber, allowing the fluid mixture to flow from the compression area to the suction cavity.

DETAILED DESCRIPTION

This disclosure relates to a relief valve assembly for a fluid end. The relief valve assembly provides pressure relief when the fluid end undergoes an overpressure event. The overpressure event can be caused by a valve getting stuck due to various reasons, allowing for the buildup of pressurized fluid mixture in a compression area of the fluid end. The relief valve assembly allows for the pressurized fluid mixture to return to the intake of the fluid mixture, usually a suction cavity. The fluid mixture can then be recycled back into the compression area.

Figure 1:
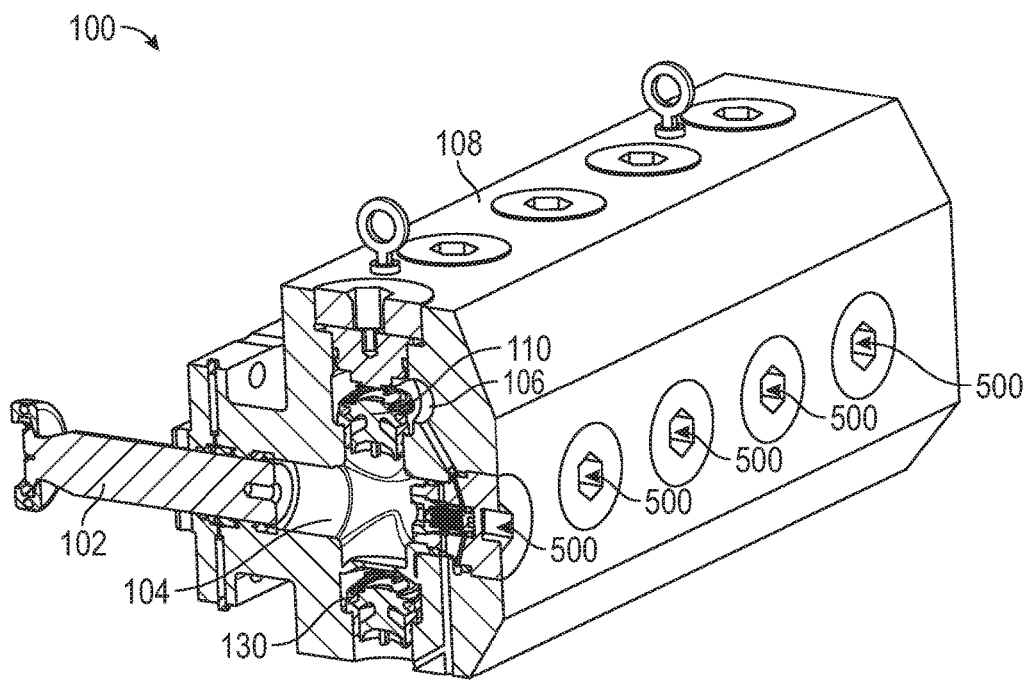
FIG. 1 is a perspective view illustrating a cross section of a fluid end according to an embodiment of the present disclosure.

FIG. 1 is a perspective view illustrating a cross section of a fluid end 100 according to an embodiment of the present disclosure. As shown, fluid end 100 may include a fluid end housing 108, a plunger 102, a compression area 104 (sometimes referred to as a plunger bore), a discharge valve assembly 110, a discharge conduit 106, a suction valve assembly 130, and a relief valve assembly 500. Fluid end housing 108 may enclose or support the rest of the components of fluid end 100. Plunger 102 may be actuated in a reciprocating fashion in and out of compression area 104. Compression area 104 may be in fluid communication with discharge valve assembly 110, discharge conduit 106, suction valve assembly 130, and relief valve assembly 500. Furthermore, fluid end 100 may include a plurality of plungers 102, a plurality of discharge valve assemblies 110, a plurality of suction valve assemblies 130, and a plurality of relief valve assemblies 500. A combination of a plunger 102, a compression area 104, a discharge valve assembly 110, a suction valve assembly 130, and a relief valve assembly 500 may be spaced apart from another similar combination along fluid end housing 108.

Figure 2:
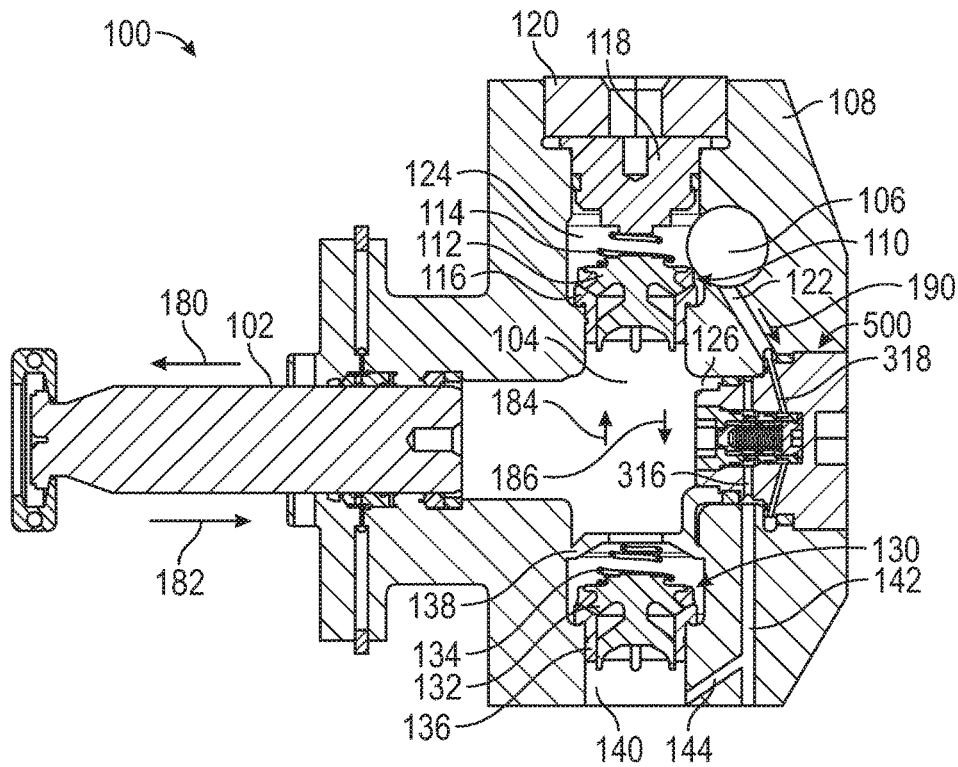
FIG. 2 is a section view of the fluid end of FIG. 1.

FIG. 2 is a section view of the fluid end 100 of FIG. 1. As shown, plunger 102 may be located at one end of fluid end housing 108. Relief valve assembly 500 may be located at the opposite end of fluid end housing 108 from plunger 102. Relief valve assembly 500 may extend through an access port 126. Discharge valve assembly 110 may be located adjacent and perpendicular from relief valve assembly 500. Furthermore, suction valve assembly 130 may be located opposite from discharge valve assembly 110. Relief valve assembly 500 may be in fluid communication with discharge valve assembly 110. In some embodiments, relief valve assembly 500 is in fluid communication with discharge valve assembly 110 via a discharge interface conduit 122 and discharge conduit 106 (sometimes referred to as a discharge rail). Relief valve assembly 500 may be in fluid communication with suction valve assembly 130. In some embodiments, relief valve assembly 500 is in fluid communication with suction valve assembly 130 via a suction interface conduit 142 and a suction return conduit 144.

Discharge valve assembly 110 may be located in a discharge cavity 124. Discharge cavity 124 may be a cavity within fluid end housing 108 and may be in fluid communication with compression area 104. Furthermore, discharge cavity 124 may be in fluid communication with discharge conduit 106. Discharge valve assembly 110 may include a discharge valve 112, a discharge biasing element 114, a discharge seat 116, a discharge cover 118, and a discharge cover nut 120. Discharge valve 112 may be configured to seal discharge seat 116. In some embodiments, discharge seat 116 is an open-ended annular cylindrical component. Discharge seat 116 may be removably attached to the walls of discharge cavity 124. Discharge seat 116 may extend through a narrow opening of discharge cavity 124 and attach to the walls of the narrow opening. Furthermore, discharge valve 112 may be movably engaged to discharge seat 116. Discharge biasing element 114 may extend between discharge valve 112 and discharge cover 118. In some embodiments, discharge biasing element 114 may bias discharge valve 112 towards compression area 104 due to compression against discharge cover 118. In some embodiments, discharge biasing element 114 is a spring.

Discharge cover 118 and discharge cover nut 120 may be coupled together. Discharge cover 118 and discharge cover nut 120 may be disposed within discharge cavity 124. In some embodiments, discharge cover 118 and discharge cover nut 120 may seal discharge cavity 124 from outside exposure. Discharge cover nut 120 may be removable to allow access to discharge cavity 124.

Suction valve assembly 130 may be located in a suction cavity 140. Suction cavity 140 may be a cavity within fluid end housing 108 and may be in fluid communication with compression area 104. Suction valve assembly 130 may include a suction valve 132, a suction biasing element 134, and a suction seat 136. Suction valve 132 may be configured to seal suction seat 136. In some embodiments, suction seat 136 is an open-ended annular cylindrical component. Suction seat 136 may be removably attached to the walls of suction cavity 140. Suction seat 136 may extend through a narrow opening of suction cavity 140 and attach to the walls of the narrow opening. Suction biasing element 134 may extend between suction valve 132 and a bracket 138. Bracket 138 may be attached to the walls of suction cavity 140. In some embodiments, suction biasing element 134 may bias suction valve 132 away from compression area 104 due to compression against bracket 138. In some embodiments, suction biasing element 134 is a spring.

Plunger 102 may actuate in a reciprocating fashion in and out of compression area 104 in a direction of arrow 180 and a direction of arrow 182. Depending on the direction of actuation of plunger 102, discharge valve assembly 110 and suction valve assembly 130 may actuate in a perpendicular direction. Additional detail of the actuation of plunger 102, discharge valve assembly 110, suction valve assembly 130, and relief valve assembly 500 will be described in FIG. 4 below.

Figure 3:
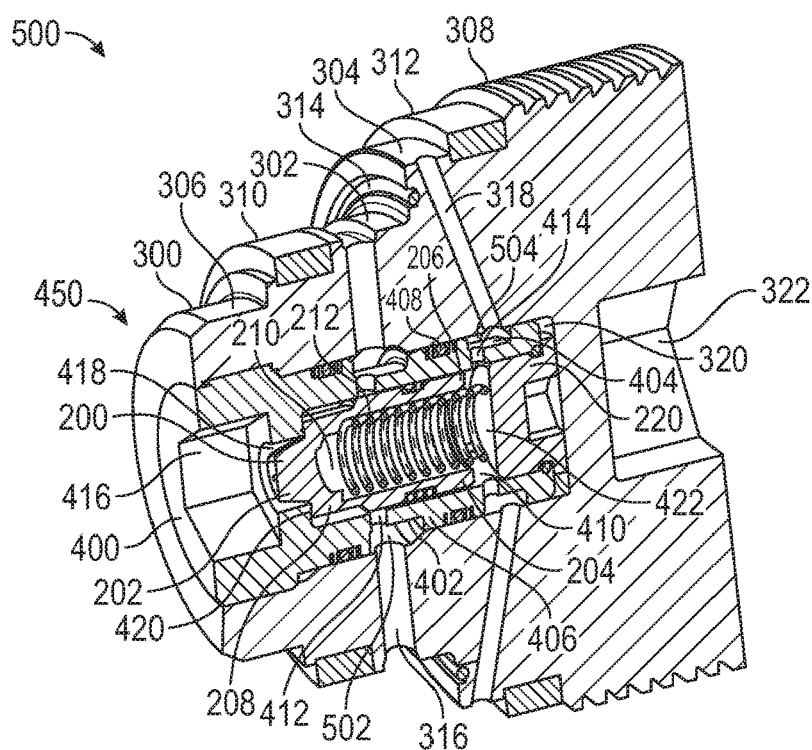
FIG. 3 is a section view of a relief valve assembly according to an embodiment of the present disclosure.

FIG. 3 is a section view of relief valve assembly 500 according to an embodiment of the present disclosure. In some embodiments, relief valve assembly 500 is a piloted check valve assembly. As shown, relief valve assembly 500 may include a cover 300, a housing 400, a piston 200, a biasing element 212, a first seal 310, a second seal 312, an o-ring 314, a valve end 220, and a plurality of conduits extending through portions of relief valve assembly 500. In some embodiments, cover 300 and housing 400 may be referred to as a housing assembly 450. Cover 300 may be an annular elongated member having multiple sections of varying diameters. Cover 300 may have a tip section 306, a relief conduit section 302, a pilot conduit section 304, and a base section 308. In some embodiments, tip section 306 has a smaller diameter than relief conduit section 302, relief conduit section 302 has a smaller diameter than pilot conduit section 304, and pilot conduit section 304 has a smaller diameter than base section 308. In some embodiments, base section 308 includes threads on the outer diameter. Furthermore, cover 300 may be capable of insertion into and removal from access port 126 by virtue of the threads on base section 308 and corresponding mating threads in the inner walls of access port 126. Cover 300 may be removable to provide access to compression area 104 and other components near compression area 104.

In addition, cover 300 may define an outer chamber 320 therein. Outer chamber 320 may extend a certain depth from one end of cover 300 towards the opposite end of cover 300. In some embodiments, a bore 322 may extend a certain depth from the opposite end of cover 300 towards outer chamber 320. Bore 322 may be configured to engage a tool to facilitate rotation of cover 300 during insertion or removal.

First seal 310 may surround a portion of cover 300. Second seal 312 may surround a portion of pilot conduit section 304. First and second seals 310 and 312 may be generally annular in shape and may be received into slots having a decreased diameter relative to the adjacent outer annular surface of cover 300 and pilot conduit section 304, respectively. O-ring 314 may be disposed within a groove adjacent relief conduit section 302. In some embodiments, O-ring 314 is located between relief conduit section 302 and base section 308.

Housing 400 may be an annular elongated member having multiple sections of varying widths. Housing 400 may have a first conduit section 402, a second conduit section 404, and a main section 406 extending in between. In some embodiments, first conduit section 402 and second conduit section 404 have a smaller diameter than main section 406. In some embodiments, first conduit section 402 and second conduit section 404 are both narrow sections, and main section 406 is a wide section. In some embodiments, housing 400 is at least partially disposed within outer chamber 320 of cover 300. Housing 400 may define a second chamber 410 therein. In some embodiments, second chamber 410 extends a certain depth from one end of housing 400 towards the opposite end of housing 400. Second chamber 410 may have a first end 420 and a second end 422 opposite from first end 420. In some embodiments, a bore 416 extend a certain depth from the opposite end of housing 400 towards second chamber 410. Furthermore, an opening 418 may extend from one end of bore 416 into second chamber 410. In some embodiments, opening 418 is an overpressure inlet to second chamber 410.

Piston 200 may be at least partially disposed within second chamber 410. Piston 200 may be an annular elongated member having multiple sections of varying widths. Piston 200 may have a main section 206 having a greater width than a narrow section 208. A front end 202 may extend from narrow section 208 away from main section 206. In some embodiments, front end 202 is tapered. In some embodiments, front end 202 extends through at least part of opening 418. Furthermore, front end 202 may seal opening 418. In some embodiments, front end 202 may have shoulders that seal open 418.

Piston 200 may define an interior chamber 210 therein. In some embodiments, interior chamber 210 extends a certain depth from one end of piston 200 towards the opposite end of piston 200.

Piston 200 may be slidably engaged along second chamber 410. In some embodiments, piston 200 may be sealably engaged to second chamber 410. In such embodiments, piston 200 may fluidly separate first end 420 from second end 422. In some embodiments, piston 200 slidably engages along second chamber 410 due to the compression of biasing element 212. As shown, biasing element 212 may be at least partially disposed within second chamber 410. Biasing element 212 may be configured to compress against valve end 220. In some embodiments, biasing element 212 biases piston 200 towards opening 418. In some embodiments, biasing element 212 is a spring. In some embodiments, biasing element 212 is a resilient component.

In some embodiments, valve end 220 is a cylindrical component. Valve end 220 may directly oppose interior chamber 210. Furthermore, valve end 220 may be located adjacent piston 200. Valve end 220 and piston 200 may be aligned to the same axis. In addition, valve end 220, piston 200, and opening 418 may be aligned to the same axis. Valve end 220 may be at least partially disposed within second chamber 410.

Cover 300 may include a relief conduit 316 and a pilot conduit 318 (sometimes referred to as a pilot inlet). As shown, relief conduit 316 may extend from an outer surface of cover 300 into the body of cover 300. In some embodiments, relief conduit 316 extends through the body of cover 300 into outer chamber 320. Relief conduit 316 may be in fluid communication with outer chamber 320. In some embodiments, relief conduit 316 is an overpressure outlet to expel fluid from outer chamber 320 and/or second chamber 410. In some embodiments, cover 300 includes a plurality of relief conduits 316. In such embodiments, each relief conduit 316 may be spaced equidistantly from each other about the circumference of cover 300. Each relief conduit 316 may be spaced equidistantly from each other about the circumference of relief conduit section 302.

Pilot conduit 318 may extend from an outer surface of cover 300 into the body of cover 300. In some embodiments, pilot conduit 318 extends through the body of cover 300 into outer chamber 320. Pilot conduit 318 may extend through the body of cover 300 at an angle. Pilot conduit 318 may be in fluid communication with outer chamber 320. In some embodiments, cover 300 includes a plurality of pilot conduits 318. In such embodiments, each pilot conduit 318 may be spaced equidistantly from one another about the circumference of cover 300. Each pilot conduit 318 may be spaced equidistantly from one another about the circumference of pilot conduit section 304.

In some embodiments, relief conduit 316 and pilot conduit 318 are not in fluid communication. In such embodiments, main section 406 may seal the transfer of fluid between relief conduit 316 and pilot conduit 318. The periphery of main section 406 may seal the transfer of fluid between relief conduit 316 and pilot conduit 318 by an interference fit. In some embodiments, an annular seal 408 surrounds main section 406 to provide a seal between main section 406 and outer chamber 320.

First conduit section 402 of housing 400 may include a relief aperture 412. Relief aperture 412 may extend from an outer surface of first conduit section 402 to second chamber 410. In some embodiments, first conduit section 402 includes a plurality of relief apertures 412. In such embodiments, each relief aperture 412 is spaced equidistantly from one another about the circumference of first conduit section 402.

In some embodiments, the outer walls of first conduit section 402 and the inner walls of outer chamber 320 may form a relief passage 502. Relief passage 502 may be an annular passage between first conduit section 402 and outer chamber 320. Relief passage 502 may be in fluid communication with relief conduit 316. As such, second chamber 410 may be in fluid communication with relief conduit 316 via relief passage 502 and relief aperture 412.

Second conduit section 404 of housing 400 may include a pilot aperture 414. Pilot aperture 414 may extend from an outer surface of second conduit section 404 to second chamber 410. In some embodiments, second conduit section 404 includes a plurality of pilot apertures 414. In such embodiments, each pilot aperture 414 is spaced equidistantly from one another about the circumference of second conduit section 404.

In some embodiments, the outer walls of second conduit section 404 and the inner walls of outer chamber 320 may form a pilot passage 504. Pilot passage 504 may be an annular passage between second conduit section 404 and outer chamber 320. Pilot passage 504 may be in fluid communication with pilot conduit 318. As such, second chamber 410 may be in fluid communication with pilot conduit 318 via pilot passage 504 and pilot aperture 414.

Industrial Applicability

The present disclosure generally applies to a relief valve assembly for a fluid end. Relief valve assembly, such as relief valve assembly 500, may relieve pressure from the compression area 104 of the fluid end 100 during an overpressure event. Overpressure in the compression area 104 can lead to failure of the fluid end. An overpressure event may arise for a variety of reasons, such as debris stuck between components of discharge valve assembly 110 or misalignment of the discharge valve assembly 110. In such events, discharge valve 112 may be stuck open, causing the high pressure fluid of discharge conduit 106 to bleed into the compression area 104. As the plunger 102 reciprocates back and forth in the compression area 104, more and more pressure builds up in the compression area 104. Relief valve assembly 500 may provide a way to redirect the overpressure build up in the compression area 104.

Figure 4:
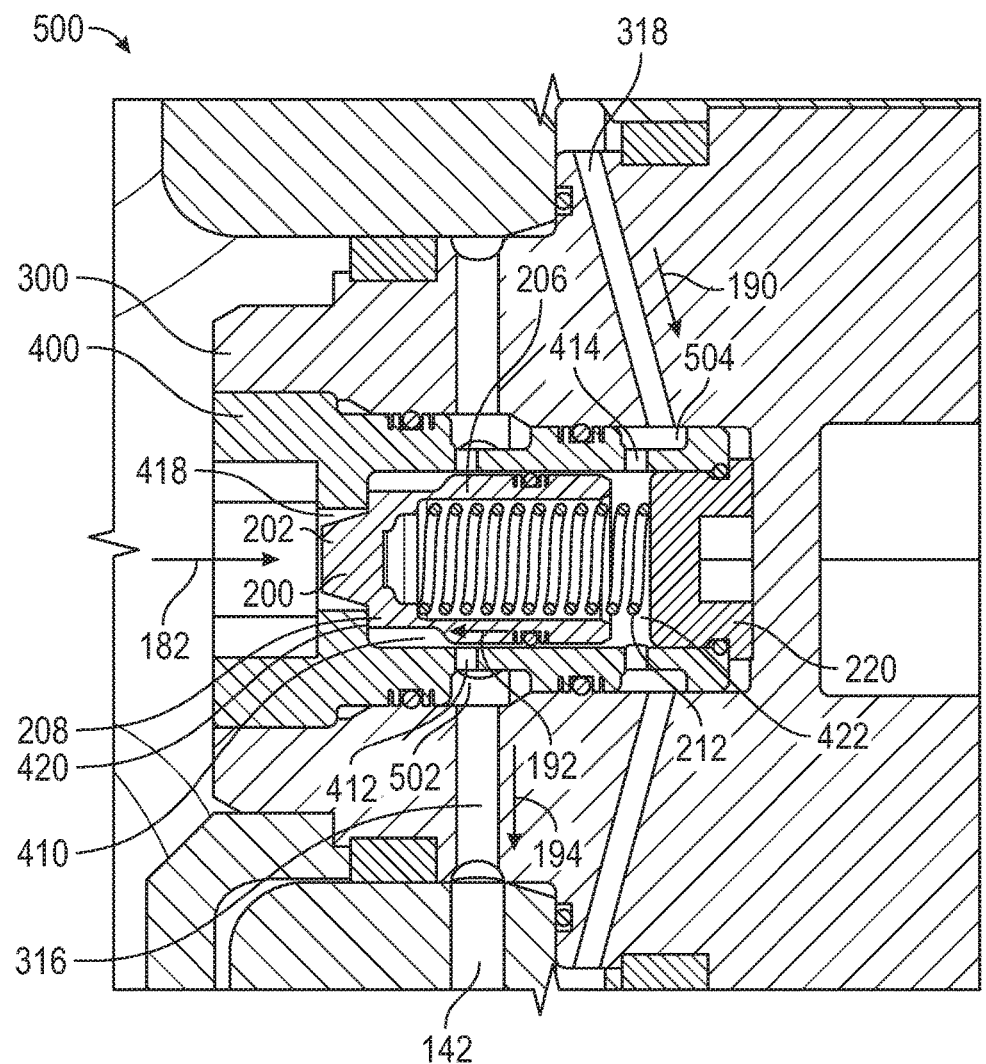
FIG. 4 is a detailed view of a portion of the fluid end of FIG. 2.

FIGS. 2 and 4 illustrate the fluid pumping process of fluid end 100. As shown in FIG. 2, plunger 102 may reciprocate back and forth within compression area 104. During a back stroke in the direction of arrow 180, plunger 102 may suction fluid from suction cavity 140 into compression area 104. Suction cavity 140 may be in fluid communication with a source containing a fracking fluid mixture (not shown). The fluid mixture may contain a fluid, such as water, and a proppant, such as sand. During the back stroke, the suction generated by plunger 102 may actuate suction valve 132 in the direction of arrow 184. This may actuate suction valve 132 towards suction biasing element 134, in which suction valve 132 may compress suction biasing element 134. In some embodiments, suction valve 132 may keep compressing suction biasing element 134 until suction valve 132 abuts bracket 138. At the same time, suction valve 132 is no longer sealing the opening of suction seat 136. This opens up a path for the fluid mixture to flow through suction seat 136 past suction valve 132 and into compression area 104.

During the back stroke, the suction generated by plunger 102 also may cause discharge valve 112 to bias in the direction of arrow 186. Discharge valve 112 may bias towards the opening of discharge seat 116. If discharge valve 112 is not sealing the opening of discharge seat 116, the suction generated by plunger 102 may actuate discharge valve 112 into discharge seat 116 and seal the opening of discharge seat 116. If discharge seat 116 is sealed by discharge valve 112, then the suction generated by plunger 102 may further seal discharge valve 112 to discharge seat 116.

During a forward stroke in the direction of arrow 182, plunger 102 may compress the volume of compression area 104. Plunger 102 may propel the fluid mixture in compression area 104 out of compression area 104. During the forward stroke, the compression force generated by plunger 102 may actuate suction valve 132 in the direction of arrow 186. In some embodiments, this may actuate suction valve 132 into suction seat 136. Further, suction valve 132 may seal the opening of suction seat 136. This may prevent the fluid mixture from flowing out of suction seat 136. Suction biasing element 134 may also bias suction valve 132 towards suction seat 136.

During the forward stroke, plunger 102 may actuate discharge valve 112 in the direction of arrow 184. This may unseal discharge valve 112 from the opening of discharge seat 116. Furthermore, the fluid mixture in compression area 104 may be propelled through discharge seat 116. The fluid mixture may flow through discharge seat 116 and into discharge conduit 106. Discharge conduit 106 may be in fluid communication with an outlet (not shown). Discharge valve 112 may bias against discharge biasing element 114 towards discharge cover 118. In some embodiments, the compression force generated by plunger 102 may have to overcome the compression forces imposed on discharge valve 112 by discharge biasing element 114.

Discharge interface conduit 122 may be in fluid communication with discharge conduit 106. Furthermore, the fluid mixture flowing through discharge conduit 106 may flow through discharge interface conduit 122 to relief valve assembly 500. Additional details concerning the flow of the fluid mixture to relief valve assembly 500 will be discussed below.

FIG. 4 is a detailed view of a portion of the fluid end of FIG. 2. As shown in FIG. 4, pilot conduit 318 may be in fluid communication with pilot passage 504. Pilot conduit 318 may be in fluid communication with discharge interface conduit 122, which is also in fluid communication with discharge conduit 106 (see FIG. 2). A portion of the fluid mixture flowing through discharge conduit 106 may be siphoned through discharge interface conduit 122. In some embodiments, a portion of the pressure derived from the fluid mixture flowing through discharge conduit 106 may be siphoned through discharge interface conduit 122. As such, the pressure of the fluid mixture flowing through discharge conduit 106 may also flow through discharge interface conduit 122, through pilot conduit 318, and through pilot passage 504.

The fluid mixture flowing through discharge conduit 106 can supply a pilot pressure to piston 200. The pressure of the fluid mixture flowing through discharge conduit 106 can reach very high levels. For example, the pressure of the fluid mixture flowing through discharge conduit 106 may be at least 6000 psi. As a result, the pressure of the fluid mixture flowing from discharge conduit 106 through discharge interface conduit 122 and pilot passage 504 may also be very high. The fluid mixture may flow through pilot passage 504 and through pilot aperture 414. In some embodiments, the fluid mixture flows through pilot passage 504 and through a plurality of pilot apertures 414. The fluid mixture flows through pilot aperture 414 and into second chamber 410 of housing 400. Biasing element 212 may bias piston 200 away from valve end 220, which may separate piston 200 from valve end 220. As a result, the fluid mixture may flow through second chamber 410 and into interior chamber 210 of piston 200. Due to the very high pressure of the fluid mixture from discharge conduit 106, the fluid mixture entering interior chamber 210 may bias and propel piston 200 in a direction of arrow 192. Piston 200 may be propelled towards opening 418. As shown, front end 202 of piston 200 may extend through opening 418 and may seal opening 418. The seal may be maintained by the pilot pressure provided by the fluid mixture from discharge conduit 106.

During an overpressure event, the seal between discharge valve 112 and discharge seat 116 may be stuck open. This may allow for the highly pressurized fluid mixture from discharge conduit 106 to enter into compression area 104 (see FIG. 2). The highly pressurized fluid mixture may be drawn into compression area 104 during back strokes of plunger 102 (see FIG. 2). Each back stroke of plunger 102 may allow for more intake of highly pressurized fluid mixture. In some embodiments, plunger 102 operates at about 400 rpm. As a result, the highly pressurized fluid mixture from discharge conduit 106 may rapidly enter and accumulate in compression area 104. The pressure within compression area 104 may reach up to 20,000 psi in such events.

Relief valve assembly 500 may provide a relief system during an overpressure event. During the overpressure event, the highly pressurized fluid mixture flowing from discharge conduit 106 through discharge interface conduit 122 and pilot conduit 318 may continue to supply pressure to propel piston 200 in the direction of arrow 192. Front end 202 of piston 200 may be inserted into opening 218 and seal opening 218 from the fluid mixture within compression area 104. The seal can be maintained at a pilot pressure generated by the fluid mixture flowing from discharge conduit 106 through discharge interface conduit 122 and pilot conduit 318.

As mentioned above, pressure can build up rapidly in compression area 104 during the overpressure event. The pressure build up may create an inlet pressure against front end 202 proximate opening 418. During a forward stroke in the direction of arrow 182, plunger 102 may generate inlet pressure against front end 202 exceeding the pilot pressure acting on piston 200 in the direction of arrow 192. In this event, piston 200 may be propelled in the direction of arrow 182 towards valve end 220. Piston 200 may compress biasing element 212 towards valve end 220. Furthermore, front end 202 may no longer maintain a seal with opening 418. As such, fluid mixture from compression area 104 may flow into second chamber 410 in the direction of arrow 182. The fluid mixture may flow between narrow section 208 and the inner walls of second chamber 410. Moreover, the fluid mixture may flow through relief aperture 412 and through relief passage 502. From there, the fluid mixture may flow through relief conduit 316 and through suction interface conduit 142. The fluid mixture may be routed through suction return conduit 144 (see FIG. 2) which feeds back to suction cavity 140.

This process may create a pressure relief loop. In particular, the overpressurized fluid mixture in compression area 104 can escape through opening 218 and feed back into suction cavity 140. This may reduce the pressure of the fluid mixture in compression area 104 and thus reduce the chances of a catastrophic failure. This may also provide time for the system to fix itself, such as allowing clumped proppants to dissipate through the pressure relief loop. In addition, once the pressure in compression area 104 reduces to a level less than the pilot pressure, opening 418 may be sealed by piston 200 and normal operations can resume.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Further, embodiments of the present application are described herein with reference to a hydraulic or hydro-mechanical fluid end for a well stimulation pump, but embodiments of the present application are not limited to hydraulic or hydro-mechanical fluid ends, and may include other hydro-mechanical devices having a pressure relief system as described herein.

All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fluid end for a well stimulation pump, the fluid end comprising:
   a fluid end housing including a compression area;
   a discharge conduit in valved communication with the compression area;
   a suction cavity in valved communication with the compression area;
   an access port in valved communication with the compression area;
   a relief valve assembly located in the access port, the relief valve assembly including
      a housing assembly defining a chamber therein, the chamber having a first end and a second end;
      a pilot inlet in fluid communication with the discharge conduit and the second end of the chamber, the pilot inlet configured to provide a pilot pressure proximate the second end of the chamber;
      an overpressure inlet adjacent the first end of the chamber;
      an overpressure outlet extending from the chamber and adjacent to the first end of the chamber;
      a piston at least partially disposed within the chamber, the piston sealably engaged to the chamber,
         the piston fluidly separating the first end from the second end,
         the piston actuatable between a first position, the piston preventing fluid communication between the overpressure inlet and the overpressure outlet, and a second position, the piston allowing fluid communication between the overpressure inlet, the overpressure outlet, and the suction cavity.

2. The fluid end of claim 1, further comprising a discharge interface conduit extending through the fluid end housing, the discharge interface conduit in fluid communication with the discharge conduit and the pilot inlet.

3. The fluid end of claim 1, further comprising a suction return conduit extending through the fluid end housing, the suction return conduit in fluid communication with the overpressure outlet and the suction cavity.

4. The fluid end of claim 3, wherein the suction cavity, compression area, the first end of the chamber, the overpressure outlet, and the suction return conduit form a pressure relief loop.

5. The fluid end of claim 1, wherein the overpressure outlet and the pilot inlet are each a conduit extending through the housing assembly.

6. The fluid end of claim 1, further comprising a biasing element at least partially disposed within an interior chamber of the piston.

7. The fluid end of claim 1, wherein the housing assembly includes a cover and a housing, the cover defining an outer chamber, and the housing at least partially disposed within the outer chamber.

8. The fluid end of claim 7, wherein the housing includes a first narrow section, a second narrow section, and a wide section extending therebetween.

9. The fluid end of claim 8, wherein the first narrow section and the outer chamber define a first annular passage.

10. The fluid end of claim 8, wherein the second narrow section and the outer chamber define a second annular passage.

11. A method for managing pressure of a fluid mixture in a compression area of a fluid end for a well stimulation pump, the fluid mixture in fluid communication with a relief valve assembly having a chamber therein, the chamber having a first end, a second end, and an actuatable piston therein, the piston having a first end and a second end, the first end of the chamber sealed by the first end of the piston, the first end of the piston in fluid communication with the compression area, the method comprising:

suctioning the fluid mixture from a suction cavity into the compression area;

pumping the fluid mixture out of the compression area into a discharge cavity and expelling the fluid mixture through a discharge conduit;

generating a pilot pressure against the second end of the piston by the discharge conduit in fluid communication with the second end of the chamber;

when the pressure of the compression area exceeds the pilot pressure, actuating the piston to unseal the first end of the chamber, allowing the fluid mixture to flow from the compression area to the suction cavity.

12. The method of claim 11, wherein the fluid mixture flows from the compression area to the suction cavity by flowing through a relief conduit of the chamber.

13. The method of claim 11, wherein the pilot pressure is generated against the second end of the piston by transferring pressure from the discharge conduit through a discharge interface conduit of the fluid end.

14. The method of claim 11, wherein the pilot pressure biases the piston to seal the first end of the chamber.

* * * * *